Figure 1:
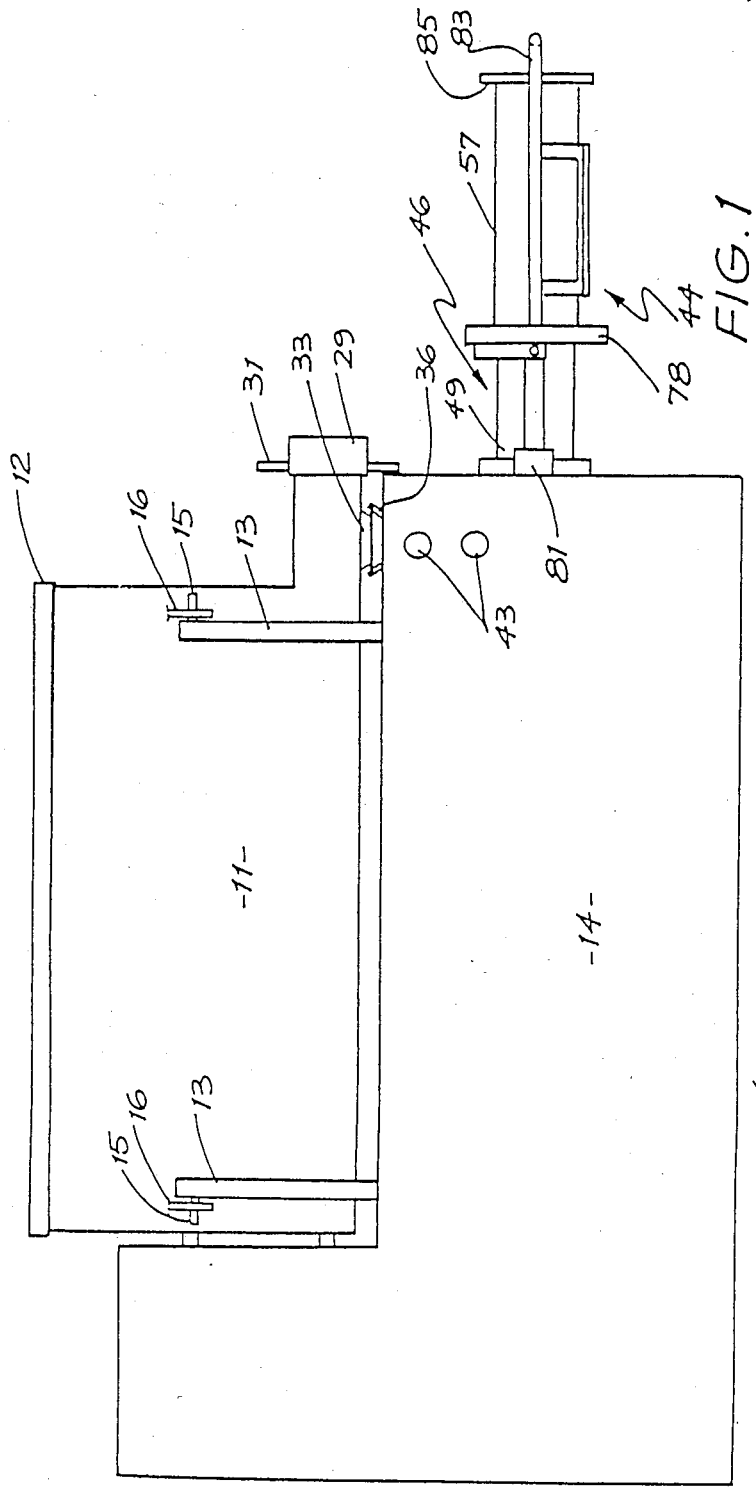

United States Patent [19]

Gibson

[11] Patent Number: 4,815,165

[45] Date of Patent: Mar. 28, 1989

[54] APPARATUS FOR THE PRODUCTION OF PROCESSED MEAT PRODUCTS

[76] Inventor: Royce G. Gibson, 7 Byengum Road, Murwillumbah, New South Wales, Australia

[21] Appl. No.: 21,230

[22] Filed: Feb. 5, 1987

[51] Int. Cl.⁴ .......................... A22C 7/00; A22C 9/00
[52] U.S. Cl. ........................................... 17/26; 17/32
[58] Field of Search .............. 17/26, 32, 40; 99/513, 99/641; 53/122, 517; 241/260.1

[56] References Cited

U.S. PATENT DOCUMENTS

| | | | |
|---|---|---|---|
| 717,959 | 1/1903 | Woodruff | 241/260.1 X |
| 2,977,629 | 4/1961 | Grebe | 17/40 X |
| 2,978,097 | 4/1961 | Blanshine | 241/260.1 X |
| 3,253,537 | 5/1966 | Porter et al. | 53/529 X |
| 3,838,551 | 10/1974 | Arikawa et al. | 53/530 |
| 3,976,799 | 8/1976 | Kelly, Jr. et al. | 17/32 X |
| 4,270,244 | 6/1981 | LoBiondo et al. | 17/26 X |
| 4,313,963 | 2/1982 | Greenspan | 426/641 X |
| 4,343,067 | 8/1982 | Shelton | 17/26 |

Primary Examiner—Willie G. Abercrombie
Attorney, Agent, or Firm—Browdy & Neimark

[57] ABSTRACT

Apparatus for the production of a coherent meat product from pieces of deboned meat, including meat derived from birds, fish, crustaceans and molluscs. The apparatus comprises receiver (11) for receiving pieces of deboned meat, meat tenderizer (33) adapted to form in the meat a plurality of cuts, scores or tears, conveyor (25) to convey the meat pieces from the receiver (11) to the tenderized (33). The meat is agglomerated by a meat reformer (44) which comprises a hopper to receive the tenderized meat pieces, a tubular member (46) extending outwardly from the hopper, a helical conveyor (45) adapted to convey meat pieces into a container (57) slidably disposed on the tube. The conveyor (45) carries at its free end a comb (54) adapted to engage with meat pieces being conveyed through the tube and to press them uniformly into the container (57).

8 Claims, 5 Drawing Sheets

APPARATUS FOR THE PRODUCTION OF PROCESSED MEAT PRODUCTS

The present invention relates to apparatus for the production of processed meat products, and products produced by such an apparatus.

The meat derived from livestock such as cattle, sheep, pigs and the like varies considerably as between the various muscle masses in any given animal. As used herein meat is taken to mean any proteinaceous muscle mass including the flesh of fish, molluscs, crustaceans and birds. The meat will also vary considerably as between different animals of the same species. These variations make it difficult for the meat trade to offer to the public an essentially consistent product or for those selling processed or cooked meat products to offer a standardised, portion controlled, product.

These problems were addressed in the applicants PCT patent application No. PCT/AU85/00120 (published under International publication No. WO85/005538 after the priority date of this application) wherein the applicant proposed a process for preparing a reconstituted meat product comprising cutting or breaking a muscle mass of an animal into a plurality of pieces, subjecting those pieces to a tenderising process, agglomerating the pieces together and subjecting the agglomerate of pieces to a compressive force. If such a compressed agglomerate is frozen in the compressed state it may then be cooked directly from the frozen state to produce a coherent cooked meat product. The frozen agglomerate may if desired be sliced prior to cooking to produce steak-like meat product.

The present invention is primarily directed to apparatus for the production of such reconstituted meat products.

The present invention consists in apparatus for the production of a coherent processed meat product, comprising receiving means adapted to receive pieces of deboned meat, meat tenderising means adapted to form in the meat pieces a plurality of cuts, scores or tears, conveying means to convey the meat pieces from the receiving means to the tenderising means, and meat reforming means comprising a hopper to receive the tenderised meat pieces from the tenderising means, a tubular member extending outwardly from the base of the hopper, and a helical conveyor disposed within the tubular member and adapted to convey meat pieces along the tubular member out of the hopper, the helical conveyor carrying on its free end distal to the hopper a comb adapted to engage with meat pieces being conveyed through the tubular member and to press them uniformly into a container slidably disposed on the tubular member. The invention further consists in processed meat products produced by such an apparatus.

The receiving means may be a simple hopper or may be provided with mixing blades to mix the meat pieces in the receiving means. The mixing blades may also serve to mix into the meat non-meat ingredients such as flavourants. The receiving means may be designed to work on a batch basis, receiving batches of meat pieces from time to time, or it may be designed to work on a continuous basis, receiving meat pieces continuously, or substantially continuously, such as from a grinding or mincing machine adapted to sever boneless meat into pieces of the desired size to be handled by apparatus according to this invention.

The present apparatus preferably processes pieces of meat that have been severed such that they have a maximum dimension of from 5 mm to 50 mm, preferably a majority of the meat pieces have a maximum dimension of from 10 to 40 mm and are very roughly spherical. Such meat pieces may be formed by passing the boned-out meat through a conventional meat mincer fitted with a "kidney plate" cutter. If desired the sinewed and sinewless meat from a carcase may be treated differently, the sinewless meat being treated as described above while the sinewed meat is passed through a conventional meat mincer fitted with a "coarse plate" cutter which produces particles of meat having a maximum dimension of about 5 mm. The sinewed and sinewless meat may then be blended together in the receiving means.

The meat pieces in the receiving means are conveyed by the conveying means to the tenderising means. Preferably the conveying means comprises a screw conveyor which has the advantage that the meat pieces are compressed and squeezed together somewhat as they are conveyed. Other conveying means such as a belt conveyer or the like could also be used.

The tenderising means serves to form a plurality of cuts or tears in the meat pieces largely without actually severing the meat pieces. This tenderising releases meat juices and cuts through tough fibres in the meat. The tenderising step is preferably carried out by passing the meat pieces between at least one pair of counter rotating, interdigitating, sets of rotary knives. In a particularly preferred embodiment of the invention one set of rotary knives is rotated faster than the other so that the tearing effect on the meat pieces is enhanced. This tearing effect emphasises the essentially fibrous nature of meat which is utilised in the reforming means as is described later in this specification.

The reforming means serves to take the tenderised meat pieces which can have a ragged, torn, cut, or fibrous appearance and to compress them into a container in a manner which enhances the entanglement of the more fibrous meat pieces so that a frozen, and then cooked, compressed meat product will be coherent and resemble natural lean meat such as steak.

The reforming means comprises a hopper into which the tenderised meat pieces drop or are conveyed from the tenderising means. A screw conveyor conveys the meat pieces from the hopper through the outwardly extending tubular member into a container disposed over the tubular member. As the meat pieces leave the screw conveyor they are engaged by a comb disposed at the free end of the conveyor which serves to spread the meat pieces around evenly in the container and more importantly to spread out the fibrous pieces of meat and to cause them to entangle with one another. It has been found that without the presence of a comb to engage with and apply an orienting force to the fibrous particles the cohesion of the resultant meat product is much less. The presence of the comb appears to orientate the fibres in a more or less helical fashion in the finished product and this seems to be of great importance in securing a satisfactory end product. The comb preferably has on its free edge a plurality of teeth. The comb, or at least the teeth thereof, preferably projects longitudinally of the tubular member beyond the free end thereof and also preferably radially beyond the circumferential edge of the tubular member. If desired, the comb may be removable from the screw conveyor such that it may be replaced with a comb of a different width in the event that a container of a different size was to be filled on the apparatus.

In a preferred embodiment in the invention, container filling means are provided to guide a container onto the tubular member, close the end of the container distal to the hopper, and provide sufficient resistance against the container being pushed off the tubular member by meat pieces being fed through the tube that the meat pieces are tightly packed into the container. The container filling means preferably includes means to engage the opposite end of a tubular container and close off the said distal end of the container, and slide means to slide the container longitudinally of the tubular member of the reforming means. A weight, spring or other means preferably bias the slide means towards the tubular member and thus serve to provide the desired resistance against the entry of meat pieces from the hopper into the container.

Figure 2:
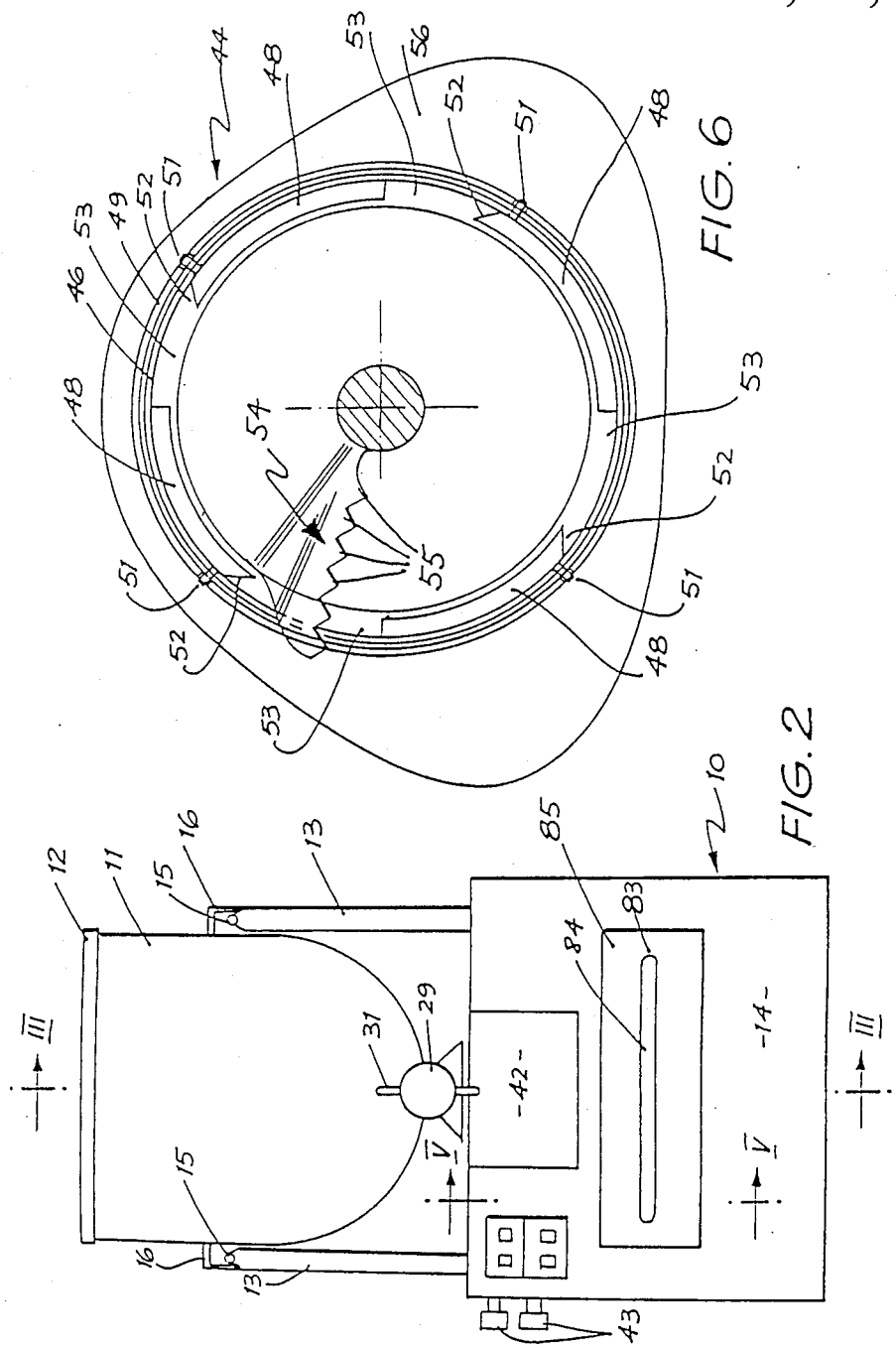
Figure 3:
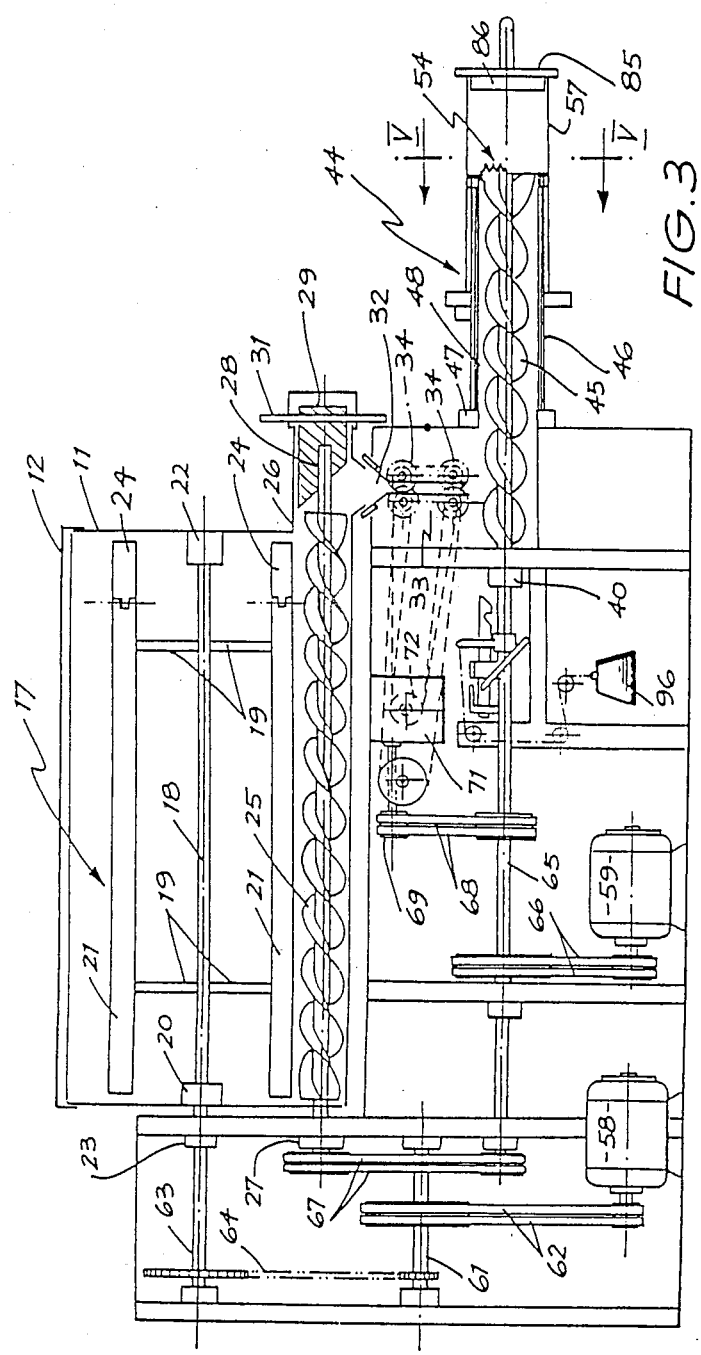
Figure 4:
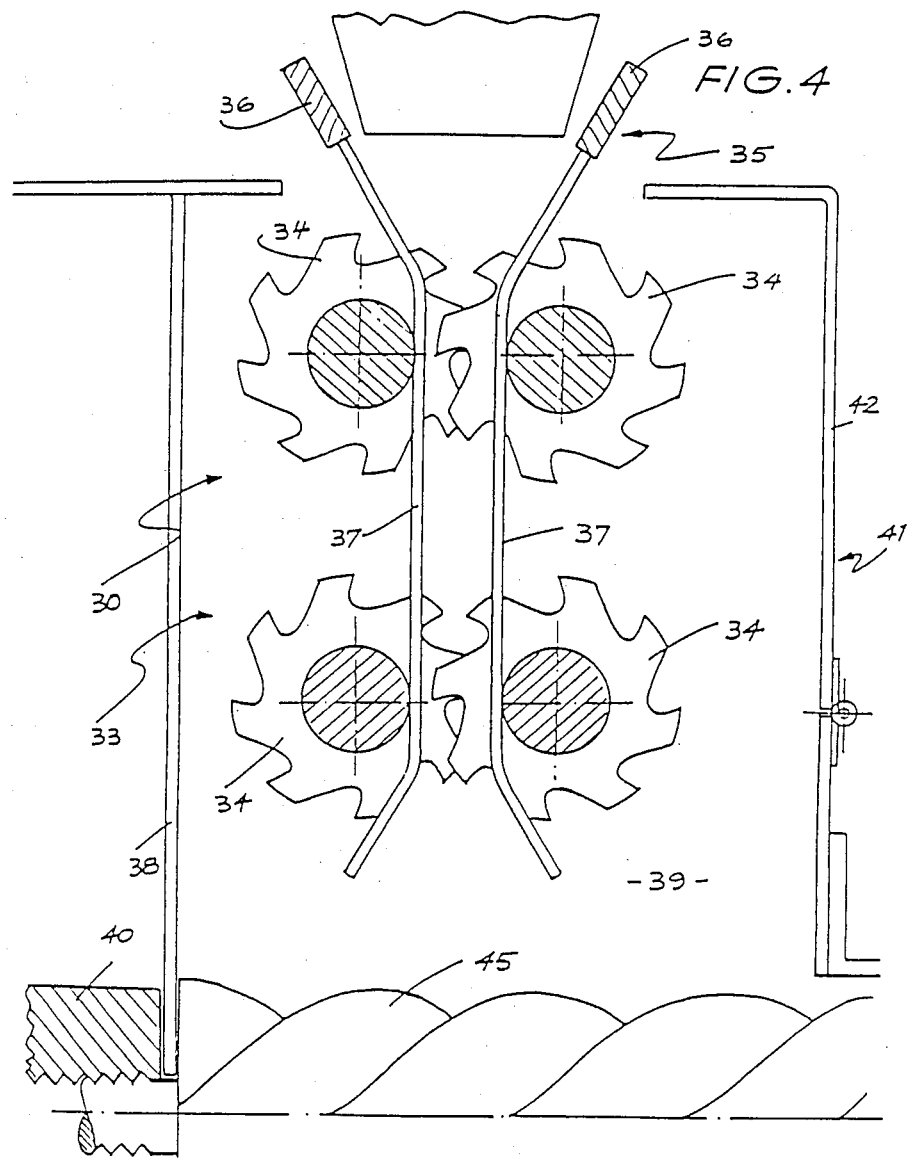
Figure 5:
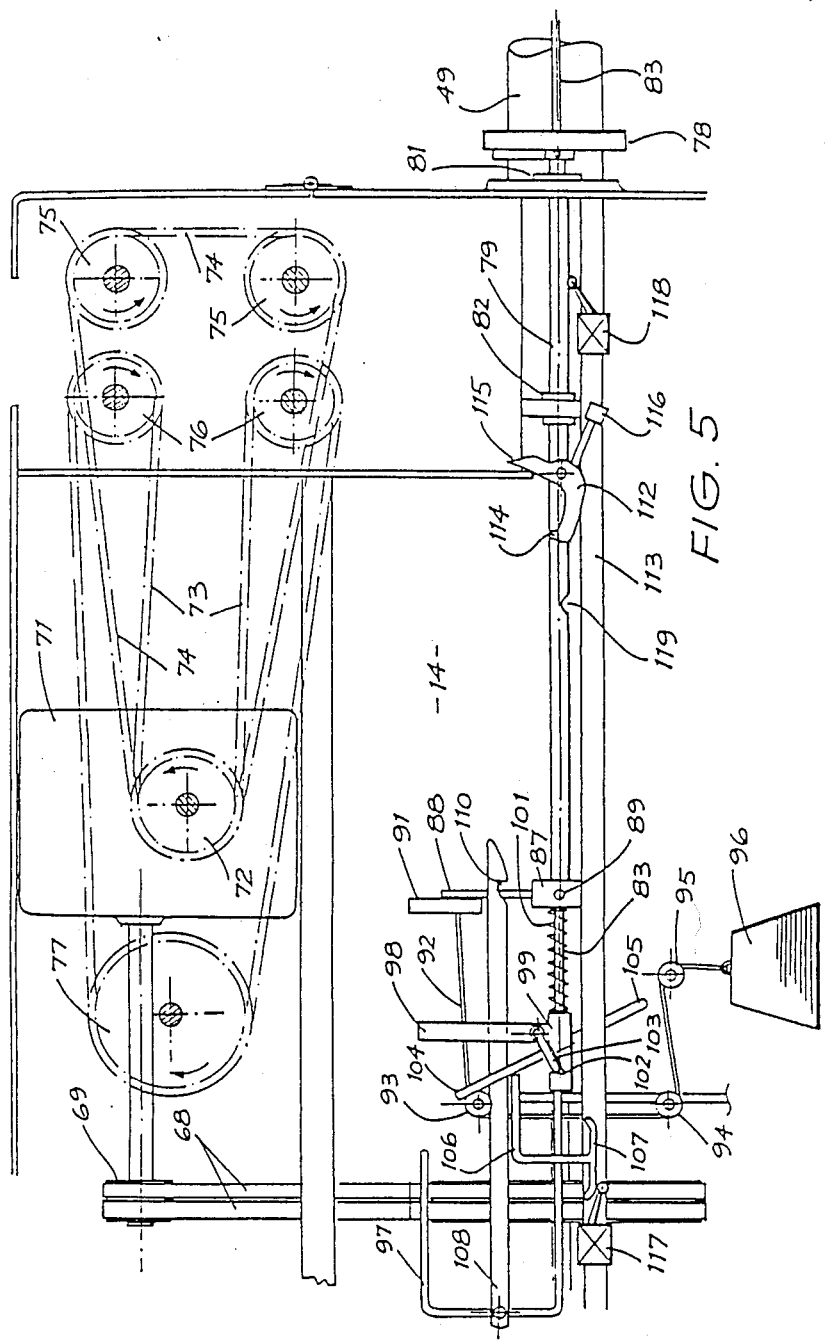

Hereinafter given by way of example only is a preferred embodiment of the present invention described with reference to the accompanying drawings in which:

FIG. 1 is a side elevational view of an apparatus according to the present invention, FIG. 2 is an end elevational view of the apparatus of FIG. 1, FIG. 3 is a vertical sectional view along III—III of FIG. 2, FIG. 4 is a detailed view of the cutting knives of the apparatus as seen in FIG. 3, FIG. 5 is a partial vertical sectional view along V—V of FIG. 2 showing the container guiding mechanism of the apparatus, FIG. 6 is an end elevational view of the tube and conveyor of the reforming mechanism of the apparatus.

The apparatus 10 includes a meat receiving hopper 11 having a lid 12. The hopper 11 is supported by four vertical legs 13 mounted on a housing 14 of the apparatus. A pin 15 extends laterally from each leg 13 and a bracket 16 welded to the hopper 11 rests on each pin 15. A bladed mixer 17 is disposed horizontally within the hopper 11 and includes a longitudinally extending spindle 18, two pairs of radially extending arms 19 and a pair of longitudinally extending blades 21. The spindle is driven by means described later in this specification. The spindle is supported at one end in a bearing 22 and the other end extends through a seal 20 in the end wall of hopper 11 and engages an a slotted drive member 23. The free ends 24 of the blades 21 adjacent bearing 22 are pivotally connected to the remainder of the blade such that they may be hinged forwardly, i.e. in the direction of movement of the blade relative thereto, such that the mixer 17 may be slid longitudinally of bearing 22 to release the driven end of spindle 18 from the drive member 23 and to allow removal of the mixer 17 from the hopper 11.

A screw conveyor 25 is disposed longitudinally in the base of hopper 11 and serves to feed pieces of meat disposed in the hopper 11 towards a tubular extension 26 of the base of the hopper. One end of the screw conveyor 25 extends through a seal 30 in an end wall of hopper 11 into a left-hand threaded drive member 27. The other end of the screw conveyor 25 is supported in a central bore 28 in a nylon plug 29 disposed in the tube 26. The nylon plug 29 is releasably retained in the tube 26 by a rod 31 which extends diametrically through plug 29 and engages with a pair of diametrically arranged L-shaped slots (not shown) in the free end of the tube 26. The end of the plug 29 proximal to the screw conveyor is inclined to the axis of the tube 26 such that meat pieces moving longitudinally of the screw conveyor 25 are directed radially downwardly out of hopper 11 through chute 32 into the tenderising means 33.

As is best seen in FIG. 4 the tenderising means 33 comprised two pairs of counter rotating rotary knife blade sets 34 each arranged to rotate about a horizontal axis, each blade set 34 comprises a spindle on which is mounted a number of annular blades in spaced apart array. Alternate blades of each pair of sets of blades 34 interdigitate so that meat pieces passing between the rollers will be deeply scored or cut by the knife blades. The drive means to drive the sets of rotary knife blades, as will be hereinafter described, are such that the left hand sets of blades 34, as seen in FIGS. 3 and 4, rotate about 15% faster than the right hand sets of blades 34. This rotational speed difference helps to impart a tearing effect to the meat pieces. In order to prevent meat fibres from wrapping around the spindles of the blade sets 34 a pair of rake-like guard members 35 are provided. Each guard member 35 comprises a horizontal bar 36 and a number of downwardly extending wires 37. One wire lies between each adjacent blade of each blade set 34. The lower ends of wires 37 are not connected together such that meat fibres which become wrapped around the wires can freely slide down the wires past the blade sets 34 and be carried on through the apparatus 10.

The blade sets 34 are disposed within a hopper section 30 of housing 11 defined by a back wall 38, a side wall 39 and a front wall 41. The front wall 41 includes an upper portion 42 hingedly connected to the remainder of the wall 41 such that portion 42 may be folded down to allow access for cleaning purposes to the rotary knife blade sets 34. Each blade set 34 is releasably retained in housing 11 by a slotted drive boss (not shown) at one end and a bearing (not shown) at the other. The bearings are spring mounted for longitudinal movement, relative to the axis of the blade sets 34, such that they may be disengaged from the spindles of the blade sets 34 by withdrawing handles 43 thus allowing removal f the blade sets 34 for cleaning.

The meat reconstitution mechanism 44 comprises a horizontal screw conveyor 45 extending across the base of hopper 11 and outwardly thereof within a barrel 46. The screw conveyor 45 is connected by a left hand thread at one end to a drive member 40 and is supported at its free end within the barrel 46. The barrel 46 includes an inner member having a flange 47 connected to the housing 11 and four longitudinally extending blades 48 of arcuate cross sections. A removable tube 49 surrounds the blades 48 for their full length. Each blade 48 includes on its outer surface adjacent its free end a projection 51 which extends through a corresponding hole in the tube 49 to retain the tube in place on the blades 48. The tube 49 may be removed for cleaning by inserting a tool into the end of the barrel 46 which has four cams which engage with inclined surfaces 52 on the blades 48 to force the free ends of the blades 48 radially inwardly and thus disengage the projections 51 from the holes in tube 49. The spaces 53 between the fingers 48 serve to guide meat along the barrel under the influence of the screw conveyor 45.

The free end of the screw conveyor 45 is provided with a comb 54. The comb has a plurality of teeth 55, which project slightly beyond the end of tube 49. The radially outer tooth 55 also projects radially beyond the tube 49 slightly. The free end of tube 49 carries a collar 36 which has a peripheral shape corresponding to the internal dimensions of a tubular container 57 into which the meat is to be filled. If it is desired to place a layer of fat on the inside surface of the container to give the finished meat product a more natural look the collar 36 needs to be smaller than the internal size of the container to allow clearance for the fat.

Two motors 58 and 59 are provided to drive the apparatus 10. The motor 58 is mounted within housing 11 and drives a shaft 61 through twin belts 62. The shaft 61 in turn is connected to a shaft 63 through a drive chain 64. The shaft 63 is connected at one end to the slotted drive member 23 which transmits the rotary motion of shaft 63 to the spindle 18 of the bladed mixer 17. The motor 59 is also mounted within housing 11. It drives a shaft 65 through twin belts 66. The shaft 66 serves to drive the screw conveyor 25 in hopper 11, the rotary blade sets 34 and also the screw conveyor 45 in hopper 33.

The screw conveyor 25 is driven through twin drive belts 67 which convey the rotary motion of shaft 65 to drive member 27. The screw conveyor 45 is driven through left-hand threaded drive member 40 which is connected to one end of the shaft 65. The rotary knife blade sets 34 are driven through twin belts 68 which drive a pulley 69 on a right angle drive gearbox 71. As is best seen in FIG. 5 the gearbox 71 carries two toothed drive wheels 72 coaxially mounted on a shaft. Two chains 73 and 74 pass around respective ones of the drive wheels 72. Chain 74 extends about toothed drive wheels 75 on the right hand, as seen in FIG. 5, blade set 34 of each pair and drives those blade sets 34 in an anti-clockwise direction. Chain 73 extends about toothed drive wheels 76 on the left hand blade set 34 of each pair and about an idler which 77 so that the right hand blade sets 34 rotate in a clockwise direction. The drive wheels 76 are of smaller diameter than the drive wheels 75 thus ensuring that the drive wheels 76 and their associated blade sets 34 are driven at a faster speed than the drive wheels 75 and their associated blade sets 34.

A mechanism is provided for controlling the filling of containers 57 positioned on tube 49. This mechanism comprises a plate 78 connected to a pair of horizontally disposed tubes 79 extending slidably through nylon bushes 81 and 82 in the housing 14 one on each side of tube 49. A rod 83 extends slidably through the bore of each of the tubes 79. The outer ends of rods 83 are connected by rod 84 and by a plate 85. On its face proximal to housing 14 the plate 85 carries a boss 86 which has the same peripheral shape as the inside of container 57 and is axial alignment with the collar 56 on the end of tube 49.

Each tube 79 carries at its inner end a collar 87. The collars 87 are connected together by a rod 88 and each collar 87 carries a pin 89 extending radially outwardly of the tube 79, the two pins 89 extending in diametrically opposite directions. A vertical bar 91 is connected at the mid-point of rod 88. A chain 92 is connected to the lower end of bar 91. The chain 92 extends about toothed rollers 93, 94 and 95 and is connected to a weight 96 which serves to bias the rod 88 and the tubes 79 to which it is connected, to the left as seen in FIG. 5.

The rods 83 extend through bores in respective stop members 80 and their inner ends 83 are connected by a rod 79. A U-shaped bar 98 is provided at each end with a tubular slide 99 slidably disposed on each of the rods 79. A spring 101 is disposed on each rod 83 between collar 87 and slide 99. Each slide 99 is formed with a V-shaped cut out 102 on its upper surface. A latch 103 is pivotably connected to bar 98 adjacent each of its ends and is adapted to rest with its free end in contact with a corresponding one of the rods 83 within the cut out 102 and to engage with a notch in that rod 83. The latches 103 are connected by U-shaped rod 104. A trip rod 105 extends downwardly from rod 104 intermediate its ends. The rod 104 carries at one end an L-shaped rod 106 which bears at its free end an actuator 107.

An elongate arm 108 is pivotably connected to rod 97 and rests in a U-shaped support 109 connected to bar 98. The free end of arm 108 carries a recess 110.

An L-shaped latch 112 is pivotably mounted on a frame member 113 and includes a hook 114 and nose 115.

In operation the apparatus 10 is readied to receive a container 57 on the tube 49 by drawing out rod 84, and with it plate 85 and rods 83 to their maximum extent. The drawing out of rods 83 will cause tubes 79 to be also drawn out due to the engagement of latches 103 in the notches in rods 83. When tubes 79 are fully drawn out the hook 114 on latch 112 will engage with pin 89 on collar 87 and simultaneously trip rod 105 will engage with stop member 116 raising latches 103. The tubes 79 will then be held against retraction under the influence of weight 96. When tubes 79 are fully drawn out the plate 78 will be positioned adjacent the collar 56 on the free end of tube 49. The rods 83, and with them the plate 85, may however, be drawn out further, following the raising of latches 103, thereby increasing the distance between plates 78 and 85. An empty tubular container 57 may then be positioned between the end of the tube 49 and plate 85 and slid over collar 56.

When plate 85 is pushed inwardly the container 57 will be pushed along tube 49 and engage with plate 78. Simultaneously recess 111 in arm 108 will engage with nose 115 of latch 112 and causing it to pivot releasing hook 114 from pin 89. Further inward movement of rods 83, tubes 79 and the container 57 is assisted by weight 96. This inward movement continues until slides 99 abut against stops 80. Further inward movement of rods 83 will allow latch 103 to again engage with the notches in the rods 83 and simultaneously cause actuator 107 to actuate a micro switch which starts motor 59. Spring 101 will urge tubes 79 and rods 83 in opposite directions thereby clamping container 57 between plates 78 and 85.

The starting of motor 59 causes meat placed in hopper 11 to be conveyed by conveyor 25 to knife blade sets and then to conveyor 45 and thus into container 57. The teeth 55 of the comb 54 engage with meat pieces being conveyed through the tube 49 and applies an orienting force to the meat pieces, which are of a fibrous nature after passing through the rotary knife sets 34, such that the fibrous meat pieces are spread evenly around in the container 57 with the fibrous pieces aligned. The pressure of meat entering container 57 will force the container 57, plates 78 and 85, the rods 83 and tubes 79 forward, i.e. to the right as seen in FIG. 5 as well. Just as pins 89 are engaged by hooks 114 and trip rod 113 is engaging stop member 116 micro-switch 118 will engage with a recess 119 in tube 79 and the motor 59 will be stopped.

The full container 57 may be released by again drawing out plate 85 and rods 83 relative to tubes 79 and plate 78. The full container is then provided with end caps and placed in a rack in which spring pressure may be applied to the spring caps to maintain the meat in the container under a compressive force. The meat may then be frozen. When removed from the container the meat may be cut into slices and maintained in a frozen state until it is desired to be used. When cooked from a frozen state, or thawed and cooked, the meat product is found to have a very coherent character without any tendency to crumble or break apart.

What is claimed is:

1. Apparatus for the production of a coherent processed meat product, comprising receiving means adapted to receive pieces of deboned meat, meat tenderising means adapted to form in the meat pieces a plurality of cuts, scores or tears, conveying means to convey the meat pieces from the receiving means to the tenderising means, and meat reforming means comprising a hopper to receive the tenderised meat pieces from the tenderising means, a tubular member extending outwardly from the base of the hopper, and a helical conveyor disposed within the tubular member and adapted to convey meat pieces along the tubular member out of the hopper, the helical conveyor carrying on its free end distal to the hopper a comb adapted to engage with meat pieces being conveyed through the tubular member and to press them uniformly into a container slidably disposed on the tubular member.

2. Apparatus as claimed in claim 1 in which the comb is provided with a plurality of teeth along its free edge.

3. Apparatus as claimed in claim 2 in which the teeth on the comb project longitudinally of the tubular member beyond the free end thereof.

4. Apparatus as claimed in claim 3 in which at least one tooth of the comb extends radially beyond the circumferential edge of the tubular member.

5. Apparatus as claimed in 4 in which the meat tenderising means comprise at least one pair of counter-rotating, interdigitating, sets of rotary knives.

6. Apparatus as claimed in claim 5 in which one set of rotary knives are rotated at a speed faster than the speed of the other set.

7. Apparatus as claimed in 6 in which container filling means are provided to guide a container onto the tubular member, close the end of the container distal to the hopper, and resiliently bias the container towards the hopper such that meat pieces fed into the container are tightly packed therein.

8. A meat product produced by an apparatus as claimed in claim 1.

* * * * *